United States Patent [19]

Vossberg

[11] 4,269,514

[45] May 26, 1981

[54] NON-CONTACT SCANNING GAGE

[75] Inventor: Carl A. Vossberg, Umatilla, Fla.

[73] Assignee: Electron Machine Corporation, Umatilla, Fla.

[21] Appl. No.: 945,350

[22] Filed: Sep. 25, 1978

[51] Int. Cl.³ .............................................. G01B 11/10
[52] U.S. Cl. .................................... 356/386; 250/560; 356/387
[58] Field of Search ................. 356/386, 387; 250/560, 250/321; 350/6.1

[56] References Cited

U.S. PATENT DOCUMENTS

| | | | |
|---|---|---|---|
| 3,108,186 | 10/1963 | Flavell | 250/321 |
| 3,905,705 | 9/1975 | Petrohilos | 356/387 |
| 3,955,072 | 5/1976 | Johannsmeier et al. | 356/400 |
| 4,097,158 | 6/1978 | DeHait | 396/386 |
| 4,101,612 | 7/1978 | Barker et al. | 356/387 |

FOREIGN PATENT DOCUMENTS 189415 5/1964 Sweden ................................. 356/387

OTHER PUBLICATIONS

Taylor, F. M. "Using a Laser Micrometer for Precision Control of Wire Diameter and Position on a CV Line", Proceedings of the 13th 23rd International Wire and Cable Symposium, Atlantic City, N.J. Dec. 1974.

Primary Examiner—R. A. Rosenberger
Attorney, Agent, or Firm—Kemon & Estabrook

[57] ABSTRACT

A non-contact gage for continuously measuring the diameter of a moving member such as a wire or rod employs a source of radiant energy, a scanner and a radiant energy detector aligned across the path of travel of the member whose diameter is to be measured. Operation of the scanner causes a composite signal to be generated in the detector and a component of that signal is proportional to the diameter of the member. The diameter proportional component is separated electronically and fed to a read out device. Inherent non-linearities or inaccuracies such as may be caused mechanically by the scanner mechanism are electronically minimized or eliminated in the detection and display circuitry.

4 Claims, 12 Drawing Figures

PHOTO DETECTOR OUTPUT

NON-CONTACT SCANNING GAGE

BACKGROUND OF THE INVENTION

There are numerous instances where it is desirable to measure physical characteristics of substances without the necessity of actual physical contact between measuring means and the substance. One example of a non-contact measuring means will be disclosed herein where a radiation type gage is used to provide a continuous indication of the diameter of a moving wire or rod. Physical contact with the rod may be proscribed because of temperature of the rod or because contact would damage the surface or interfere with the desired rod movement.

BRIEF SUMMARY OF THE INVENTION

The diameter of a moving wire or rod is measured by placing a source of light or other radiation on one side of the wire and a photo or other detector on the opposite side. A scanning means which can take any one of a number of different forms is operative to cause the photo detector to generate a composite signal, one component of which is directly proportional to the diameter of the wire or rod. Appropriate electronic circuitry separates the diameter proportional portion of the photo detector output and the resultant signal energizes a continuous readout of the actual diameter. In the event that errors are introduced due to, for example, non-linear scanning, an automatic correction may be introduced electronically to minimize or eliminate these and other errors such as caused by a distortion (refraction in sight windows, color aberrations, and the like).

DETAILED DESCRIPTION

Figure 1:
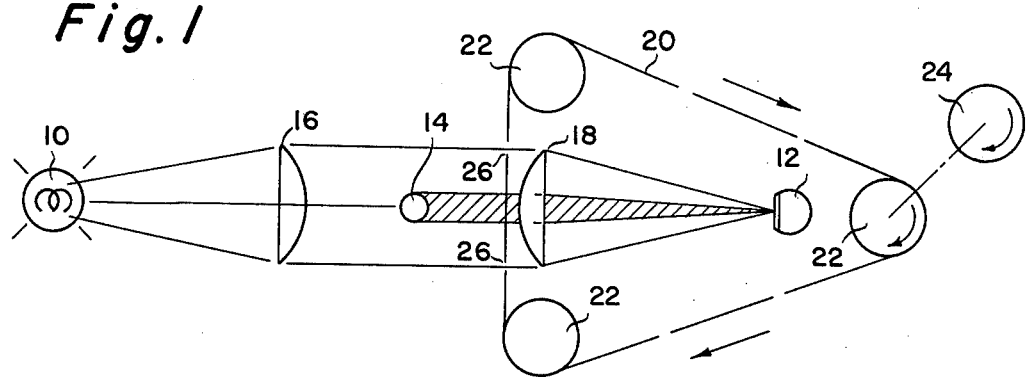
FIG. 1 is a diagrammatic illustration of the scanning and detection portion of a non-contact diameter measuring gage.
Figure 2:
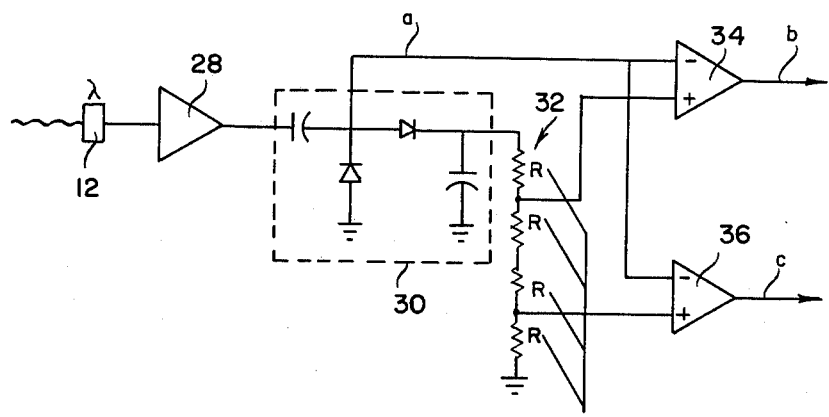
FIG. 2 is a schematic diagram in block form of the circuitry for separating the diameter signal from the composite signal generated in the detector by the scanning gage.

Referring first to FIG. 1, a light source 10 and a photo detector 12 are positioned on opposite sides of the path of travel of a moving wire or rod 14 (perpendicular to the plane of the drawing). First and second collimating lenses 16 and 18 are positioned respectively between the source and the wire and between the wire and detector. One possible scanning arrangement shown here includes an opaque belt 20 trained around pulleys 22 and driven by a motor 24. The belt 20 includes a plurality of equally spaced transparent portions or slits 26. As will be obvious to those skilled in the art, movement of the belt in the plane indicated effectively causes scanning resulting in cyclic illumination of the photo detector. Scanning linearity can be assured by having the motor drive a high inertia capstan through a flexible O-ring belt. Referring now to FIG. 2, the photo detector 12 of FIG. 1 has its output connected to the input of an amplifier 28. The amplified signal is fed to the input of a peak-to-peak detector 30, the output of which is fed to a voltage divider 32 which includes four equal resistors connected to ground. The voltage divider provides biasing signals for a pair of comparators 34 and 36, the inputs of which are both connected to the amplified signal from the photo detector 12.

Figure 3:
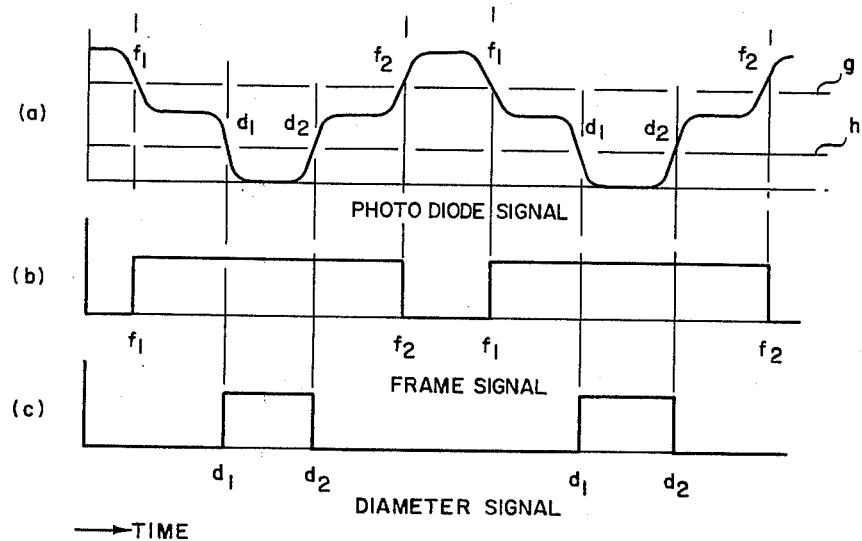
FIG. 3 shows wave forms of the circuit of FIG. 2.

Referring now to FIG. 3, the wave forms will aid explanation of the operation of the circuit of FIG. 2. In response to scanning signals produced in the photo detector 12 of FIG. 1 during movement of the belt 20, the maximum output signal of the detector 12 will occur when a pair of slits 26 of the belt 20 are positioned in the path of the collimated light beam from the source 10 as illustrated in FIG. 1. As one of these slits leaves the light beam, the signal drops to half value at a time f1 which marks the beginning of a frame. When the remaining slit enters the shadow of the wire or rod under measurement, the output of the photo detector drops to zero at point d1 which is the beginning of the diameter measurement. As the slit re-emerges from the shadow, the output of the photo detector returns to half value at d2 and this continues until the next slit also enters the light beam at time f2 which completes one frame as the photo detector returns to maximum output corresponding to illumination from two slits.

This measurement cycle repeats with the passage of each successive film slit through the light beam, the shadow of the specimen, again into the light beam and then exiting from the light beam. As illustrated in curve "a" of FIG. 3, the signal transitions are not instantaneous but sloped with time and the corners are rounded due to optical and electrical imperfections in the system.

Figure 4:
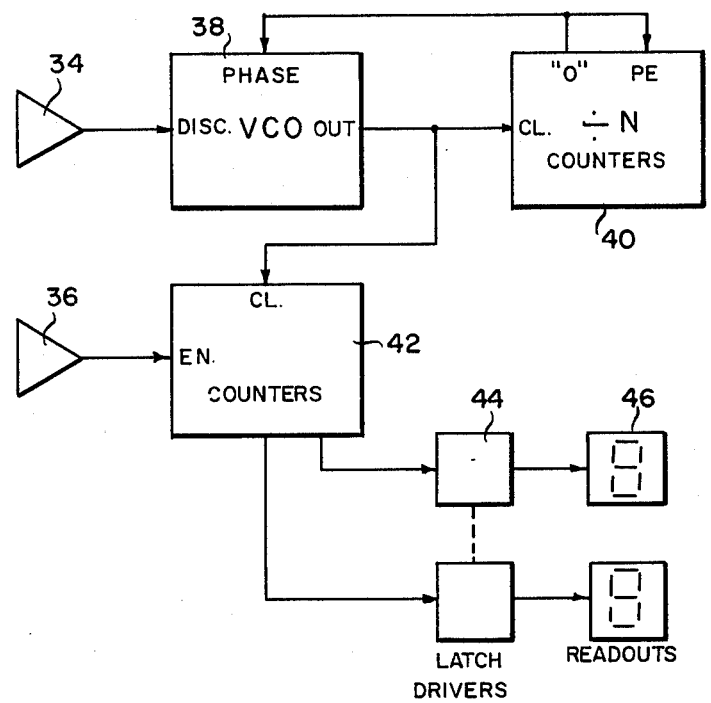
FIG. 4 is a block diagram of one means for effecting a continuous display from the circuitry block diagram of FIG. 2.

Referring now to FIG. 4, a voltage controlled oscillator 38 (which can be industry type 4046) is connected to the output of comparator 34. The frequency of the oscillator is regulated by comparing its output frequency and phase to the frame signal after being scaled down by programmable divide-by-N counters 40. The latter may be cascaded counters of the type manufactured by Motorola and designated MC14522. In this manner, the oscillator 38 produces exactly the number of pulses per frame as set by the divide-by-N counters 40.

The same output pulses of the oscillator 38 are also applied to the clock terminal of a gate/counter 42. The counter 42 may be of the type manufactured by Motorola and designated MC14520 or MC14518. The outputs of the gate/counters are fed to latch drivers 44 which in turn drive readouts 46 to provide an appropriate reading of the number of pulses occurring within the diameter gaging signal corresponding to the actual diameter when calibrated by correctly setting the divide-by-N counters. The readouts may be HT5082-776. Obviously, not all interconnections, power supplies, filters, pulse shapers, and reset circuitry have been shown, but these are well known in the art and their ommission from this figure is merely for purposes of clarity.

The four equal resistors of the divider 32 divide the peak direct current voltage to reference bias the comparators 34 and 36 to the levels shown in "g" and "h" on curve "a" in FIG. 3. As the signal level crosses the "g" bias, comparator 34 switches and produces an output signal which is illustrated in curve "b" of FIG. 3. As the signal level crosses the bias "h" of curve "a" in FIG. 3, comparator 36 switches and produces an output signal corresponding to the curve "c" of FIG. 3. Thus, the frame and diameter signals are effectively separated from the composite signal and the time interval between the beginning and ending of the pulse outputs of the comparator 36 corresponds to the diameter of the specimens under measurement and this interval will vary in response to variations in diameter along the length of the moving specimen. The frame signal indicates the time between the leading edge of one film slit and the following edge of the previous film slit.

It should be noted that the diameter signal remains accurate regardless of changing signal levels which can occur for example with light output variations (aging, power, discoloration, and dirt) and photo tube detection efficiency. The cross-over for the diameter measurement is always one-fourth of the way up and the frame signal is three-fourths of the way up this composite signal because of the respective junctions of the four equal resistors of the divider 32.

For a linear scanning arrangement such as illustrated in FIG. 1, it becomes possible to set exactly the appropriate number of pulses which occur within each frame period and to maintain this number constant independent of internal and external parameters. This permits the calibration of the instrument to remain correct as long as the scanning is uniform and constant over the frame period. If the scanner for any reason were to scan in one-half the time, the pulse generator would automatically compensate by lowering its frequency to place the same number of pulses as before within the frame period as determined by the divide-by-N counter setting and controlled by the phase discriminator.

By way of an example, if the slits 26 of the belt 20 are spaced 1.2345 inches apart, the divider could be set to 12,345 to 1 so that 12,345 pulses would be transmitted by the voltage controlled oscillator during the passage time between adjacent slits. If the specimen under measurement were 0.5000 inches, then its shadow would gate out 5,000 pulses and these would be indicated on the readouts 46 as 0.5000. As a practical matter, however, there is no reason to restrict the divider to any such ratio. In the above example, the number of pulses per frame could just as easily be set to 1,234,567, for example, and the only limitation would be that imposed by the frequency response of the system. Other modifications could include accumulating pulses over more than one frame such, for example, as ten frames or more and then averaging the readout over this period. Calibration of the device is easily effected by simply placing a known standard in the beam and then adjusting the divider until the correct readout is indicated.

Figure 5:
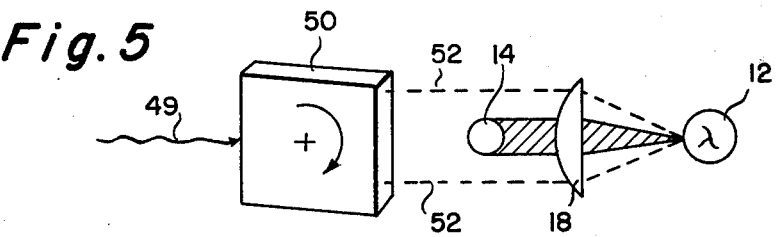
FIGS. 5 and 6 are alternative forms of scanning apparatus.

Referring now to FIG. 5, a light beam 49 from any source such as an incandescent lamp or a laser is refractively translated by a rotating transparent square or other polygonal prism 50. The prism may be formed of glass, plastic, sapphire, or any transparent material having an index of refraction greater than one. The translated beam 52 is swept parallel to itself as the prism rotates. It can be mathematically shown that the displaced beam is swept non-linearly by the following formula:

$$d = \frac{s \sin\left[\theta - \sin^{-1}\left(\frac{\sin\theta}{n}\right)\right]}{\cos\left[\sin^{-1}\left(\frac{\sin\theta}{n}\right)\right]}$$

where
d = distance the beam is displaced from the center line;
s = dimension of side of prism (square);
$\theta$ = angle of prism rotation;
n = index of refraction of prism.

Figure 6:
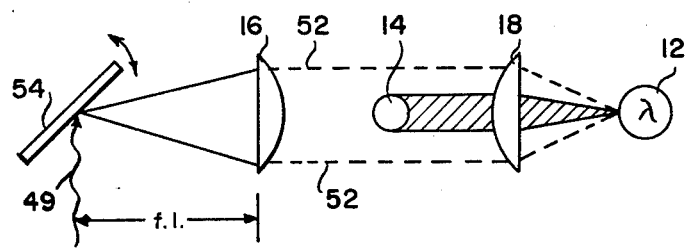

FIG. 6 shows another alternative scanning embodiment in which the beam of radiation 49 is reflected from a mirror 54 which is rotated or oscillated through the desired scanning angle.

The displacement of the light beam 52 is a function of the focal length of the collimating lens 16 in accordance with the following expression:

$$h = f.l. \tan 2\theta$$

where
h = the distance of displacement of the beam 52 from the center line;
f.l. = the focal length of the lens 16; and
$\theta$ = the angle of rotation of the mirror 54.

The displacement therefore is also non-linear with time, changing relatively slowly at first and increasing rapidly as the angle of rotation increases. Assuming the oscillation of the mirror to be sinusoidal, the above expression remains valid but the angle of rotation varies as:

$$\theta = \theta_{max} \sin \psi, \text{ or}$$
$$h = f.l. \tan 2\theta_{max} \sin \psi$$

For small angles the sine of an angle is almost complementary to the tangent. For $\theta_{max} = 20.31°$, the error is very small and compensated up to ±6 degrees.

Figure 7:
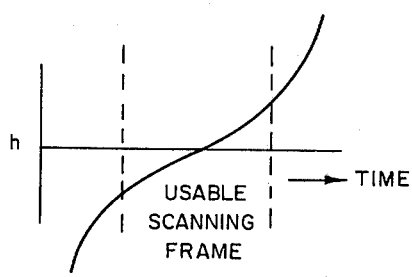
FIGS. 7 and 8 show wave forms from the circuitry of the block diagram of FIG. 4.
Figure 8:
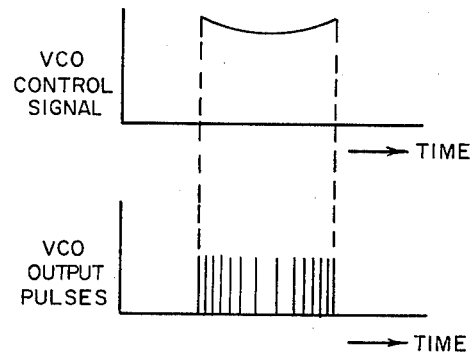
Figure 9:
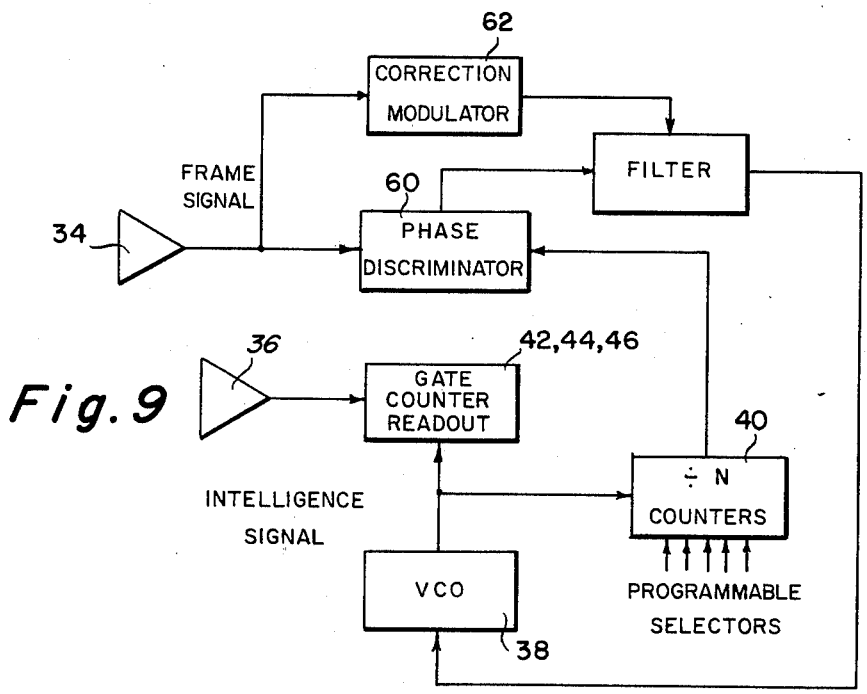
FIG. 9 is a block diagram of circuitry which is an alternative embodiment to that shown in FIG. 4, and which eliminates or minimizes the inherent errors due to non-linearity of the scanner.

With reference to FIGS. 7, 8 and 9 a method and circuit will be described which is effective to correct for the above mentioned errors due to non-linearity of scanning as well as for other reasons.

To summarize the operation of the system heretofore described with reference to FIG. 4, the output frequency of a voltage controlled oscillator is divided by connecting it to a programmable divide-by-N counting chain and the resultant signal is compared as to both frequency and phase with the scanning frame signal. The phase comparator develops an output voltage, the magnitude of which is used to adjust the frequency and phase of the voltage controlled oscillator and consequently the divide-by-N counter output frequency and phase to match exactly that of the scanner. Under locked conditions therefore, there will always be the same number of pulses from the voltage controlled oscillator during the scanning period and the actual number is determined by the setting of the divide-by-N counter. The final readout is determined by those pulses which are counted during the gating period which is controlled by the diameter of the specimen being measured.

Where the error is position or time related as would be caused by the scanner of FIGS. 5 or 6, the VCO can be frequency modulated to compensate for the error. If an alternating signal synchronized with the scanning period is injected onto the control voltage which is controlling the frequency of the voltage controlled oscillator, the time distribution of these pulses during the scanning period will remain in accordance with the setting of the divide-by-N counter. In other words, the time distribution of the set total number of pulses can be varied to suit or compensate for undesired extraneous variations and the actual readout will then be affected by the time location of the gating period within the total frame period. To illustrate this principle, assume that the non-linearity due to scanning, for example, follows a tangent function as illustrated in FIG. 7. Due to the fact that the scanning speed increases, the further the beam is displaced from the center line, an error in the readout will result as the diameter increases or as the specimen is displaced from the scanning center line because the readout will show a disproportionately small increase. However, by superimposing a signal onto the voltage controlled oscillator control signal to frequency modulate the oscillator so that its frequency increases with the displacement from the frame center line, the resultant effect is to compensate for non-linearity in scanning. FIG. 8 shows a comparison between the voltage controlled oscillator control signal and the time distribution of the output pulses of the VCO. It will be understood that in actual practice the number of pulses will be in the thousands rather than as illustrated in FIG. 8.

FIG. 9 is a simplified block diagram of a circuit arrangement similar to that of FIG. 4, but modified to provide compensation for example for non-linearity. The phase discriminator 60 is shown as separate from the voltage controlled oscillator 38 to more clearly show the functions of the phase discriminator. As before, the output of the VCO is fed to the divide-by-N counters 40 to produce a signal which is a sub-multiple of the frequency of the VCO. This is fed to a phase discriminator 60 for comparison with the frame signal output of comparator 34. The phase discriminator 60 produces an error signal to regulate the VCO so as to make the two inputs to the phase discriminator equal in frequency and phase. In other words, under lock conditions, the number of pulses of the VCO output is N times the frame signal or stated otherwise there will be N pulses from the VCO between successive frame pulses.

The correcting signal complement to compensate for non-linear scanning effects can be developed by the same optical scanner causing the error, or the frame signal can empirically synthesize the required error correction in a modulator 62. The output signal of the modulator 62 super-imposes or mixes with the more or less steady controlling signal from the phase discriminator 60 to cyclically vary the instantaneous frequency output of the VCO 38.

Figure 10:
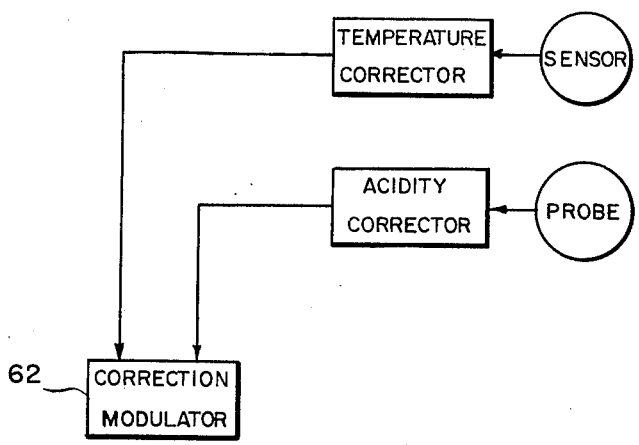
FIG. 10 is a block diagram showing adaptation of the circuit of FIG. 9 to a measuring device of the type shown in my prior U.S. Pat. No. 2,807, 976.

In FIG. 10, there is illustrated in block diagram form application of the circuit of FIG. 9 to the scanning refractometer of my prior U.S. Pat. No. 2,807,976. In this manner, additional correction signals corresponding to temperature and acidity for example of the liquid under test, are fed to the correction modulator 62 in order to modify the time distribution of the output pulses of the VCO accordingly.

Optionally, if the required error correction is a constant over the scanning period, then the divide-by-N counters can be electronically modified to alter the overall calibration in the correct manner. As will be obvious to those skilled in this art the incorporation of microprocessors and computer technology will make it possible to achieve almost infinite flexibility and precision. Also, for greater accuracy, stability and readout convenience, more counting periods can be totaled. For example, ten or one hundred frames can be accumulated and read out before updating to the next ten or one hundred frame period. This averages the counts over a relatively long period of time, and it is obvious that the frequency of counts and therefore the resolution of readout can be as high as desired.

Figure 11:
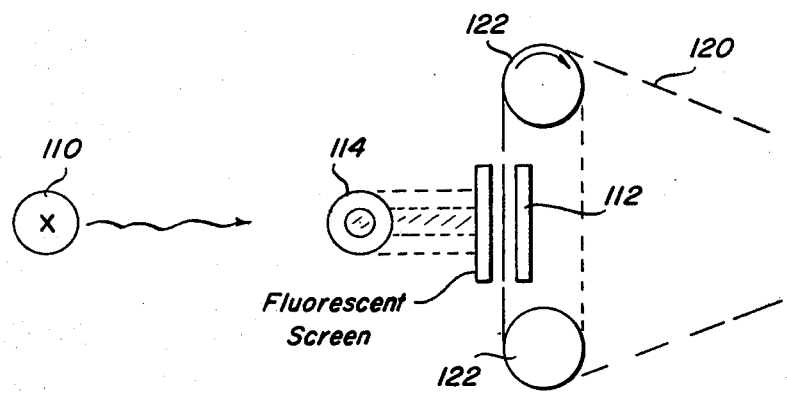
FIG. 11 is a diagrammatic showing similar to FIG. 1, but illustrating a variation useful in connection with cored rods or wires.

FIG. 11 shows apparatus similar to that of FIG. 1 but using a source of penetrative radiation 110 such as x-rays or gamma rays. The member 114 to be measured is cored and with this arrangement, measurements can be made of the outside diameter, the core diameter and eccentricity of the two. A flourescent screen is placed between the member 114 and the detector 112. The scanning arrangement including the slotted opaque belt 120 and pulleys 112 can be the same as in FIG. 1 or could take the optional configuration indicated in this figure.

Figure 12:
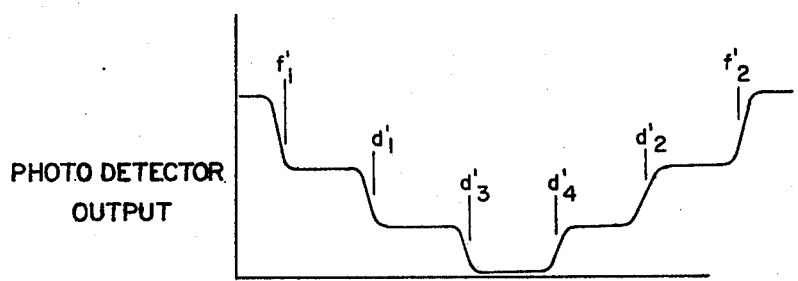
FIG. 12 shows wave forms similar to FIG. 3 to explain the operation of the arrangement of FIG. 11.

Referring to the waveform of FIG. 12, which shows the output of the detector 112 during a scanning cycle, $f_1' - f_2' =$ frame
$d_1' - d_2' =$ function of outside diameter
$d_3' - d_4' =$ function of inside or core diameter
$d_1' - d_3'/d_4' - d_2' =$ function of eccentricity While preferred embodiments of the present invention have been herein disclosed, Applicant claims the benefit of a full range of equivalents within the scope of the appended claims.

I claim:

1. A non-contact gage for measuring a dimensional characteristic of a specimen comprising in combination:
   a source of radiation on one side of the specimen;
   a radiation detector facing and aligned with said source on the opposite side of the specimen;
   linear scanning means including a constant speed belt, opaque to said radiation and having a plurality of equal parallel non-opaque areas extending transversely across said belt and spaced equally from each other a distance at least as large as the dimensional characteristic to be measured, located and movable between said source and the specimen for periodically sweeping a beam of radiation across the specimen causing said detector to generate a composite signal including a frame signal and an intelligence signal, the ratio of the duration of said intelligence to said frame signal being proportional to the desired dimensional characteristic of the specimen;
   means for separating said intelligence signal from said frame signal including a peak to peak signal detector connected to be driven by the output of said radiation detector and a pair of comparators, each having a signal input and bias input said signal inputs being connected to the output of said peak to peak detector for reference biasing said comparators at different levels so that the on time of one comparator is a dimensional proportional signal and the output of the other comparator is a frame signal proportional to the time of one scan cycle; and indicating means coupled to said separating means for displaying said dimensional characteristic.

2. A gage as defined by claim 1 which includes:

a voltage controlled oscillator connected to be driven by said frame signal;

a divide by N counter connected to the output of said voltage controlled oscillator and its output connected to the phase discriminator of said voltage controlled oscillator to control the frequency of said voltage controlled oscillator so that it produces exactly the same number of pulses per frame as set by said divide by N counter;

a gated counter having its input connected to said diameter signal and its clock terminal connected to the output of said voltage controlled oscillator; and said display means being connected to be driven from the output of said counter.

3. A gage as defined by claim 1, including:

a voltage controlled oscillator;

a phase discriminator having said frame signal connected to one input;

means connecting the output of said discriminator to said oscillator;

a divide-by-N counter connected between said oscillator and said phase discriminator;

a gate counter readout connected to said oscillator; and means connecting said diameter proportional signal to said counter.

4. A non-contact gage for measuring a dimensional characteristic of a specimen comprising in combination:

a source of radiation on one side of the specimen;

a radiation detector facing and aligned with said source on the opposite side of the specimen;

linear scanning means including a constant speed belt, opaque to said radiation and having a plurality of equal parallel non-opaque areas extending transversely across said belt and spaced equally from each other a distance at least as large as the dimensional characteristic to be measured, located and movable between said source and the specimen for periodically sweeping a beam of radiation across the specimen causing said detector to generate a composite signal including a frame signal and an intelligence signal, the ratio of the duration of said intelligence to said frame signal being proportional to the desired dimensional characteristic of the specimen;

means for separating said intelligence signal from said frame signal including a peak to peak signal detector connected to be driven by the output of said photo detector and a pair of comparators each having a signal input and a bias input said signal inputs being connected to be driven by said composite signal;

means including a voltage divider connected to the output of said peak to peak detector for reference biasing said comparators at different levels so that the on time of one comparator is a diameter proportional signal and the output of the other comparator is a frame signal proportional to the time of one cycle; and indicating means coupled to said separating means for displaying said dimensional characteristic.

* * * * *